Dec. 16, 1952 — C. A. PASSANNANTE — 2,622,206
CAMERA DRIVE

Filed June 4, 1951 — 3 Sheets—Sheet 1

INVENTOR
CHARLES A. PASSANNANTE
BY
Angelo M. Pisana
ATTORNEY

Dec. 16, 1952 C. A. PASSANNANTE 2,622,206
CAMERA DRIVE
Filed June 4, 1951 3 Sheets-Sheet 2
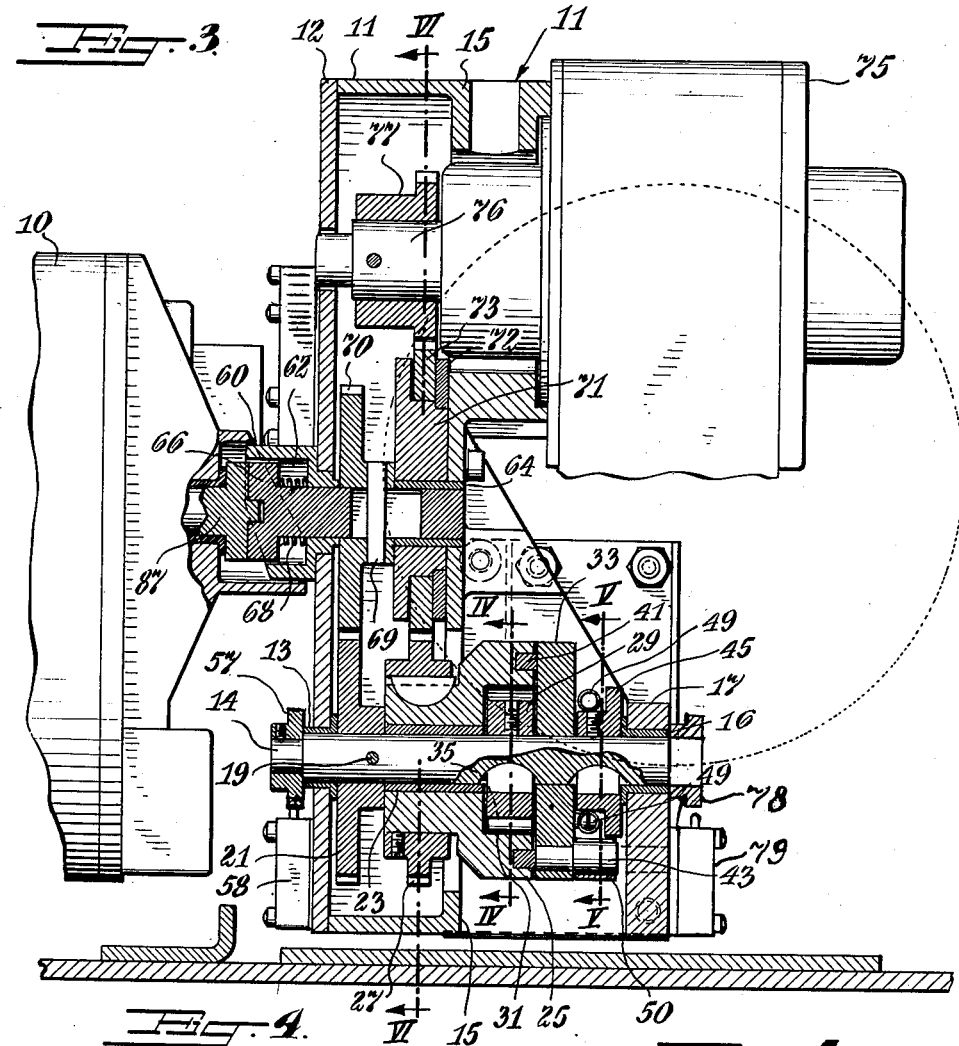
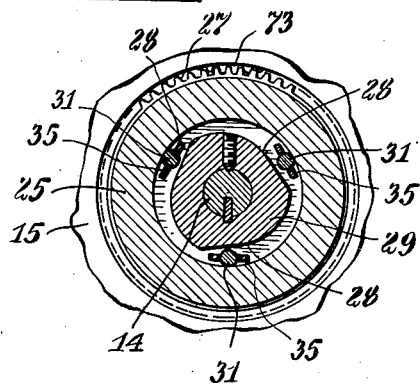
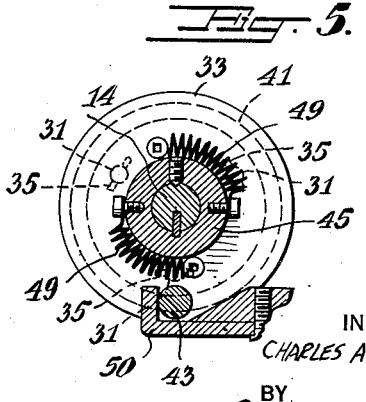
INVENTOR
CHARLES A. PASSANNANTE
BY
Angelo M. Pisarra
ATTORNEY Dec. 16, 1952  C. A. PASSANNANTE  2,622,206
CAMERA DRIVE
Filed June 4, 1951  3 Sheets-Sheet 3
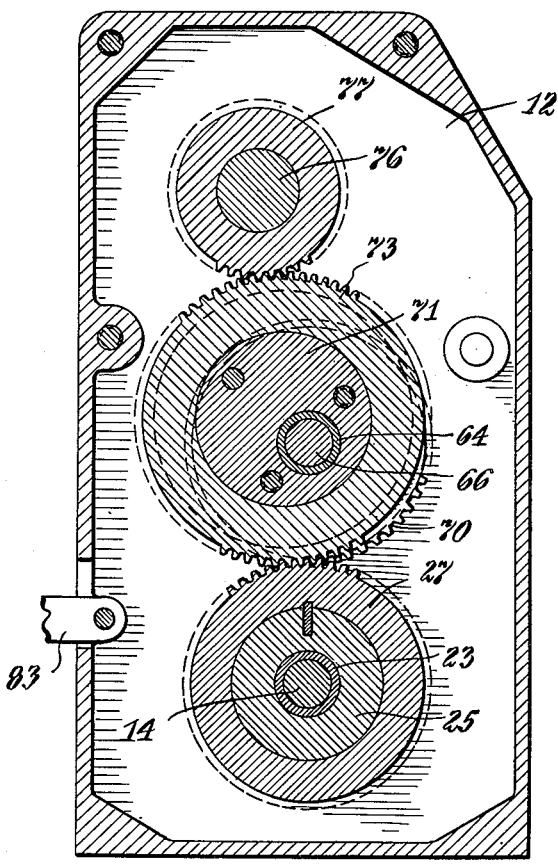
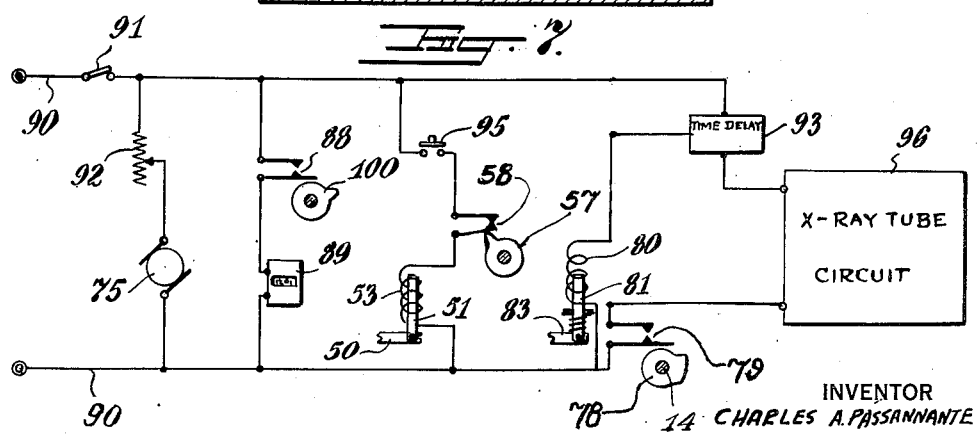
INVENTOR
CHARLES A. PASSANNANTE
BY
Angelo M. Pisaria
ATTORNEY Patented Dec. 16, 1952

2,622,206

UNITED STATES PATENT OFFICE 2,622,206

CAMERA DRIVE

Charles A. Passannante, Hempstead, N. Y., assignor to F-R Machine Works, a firm

Application June 4, 1951, Serial No. 229,819

5 Claims. (Cl. 250—66)

This invention relates to X-ray mechanism and also to a drive component thereof. This invention relates to novel combinations of an X-ray roll film cassette together with a novel driving unit and also to the novel driving unit per se. In one of its more specific aspects the invention is directed to novel apparatus which may be coupled with an X-ray tube and an X-ray film so that X-ray pictures of predetermined exposures and intervals between exposures may be easily and readily controlled.

Prior to this invention roll films in various types of cameras used in the X-ray field were driven by various types of mechanisms. Generally the film was intermittently fed or exposed at predetermined intervals, and this action was obtained by starting and stopping an electric motor which drove the camera mechanism. Those devices were not entirely satisfactory because they required the use of a braking mechanism to overcome the inertia of the motor commutator or shaft.

In the course of my experimentations I have discovered that I may provide the combination of an X-ray roll film camera together with a driving mechanism to drive the film either intermittently or continuously sequentially without the necessity of stopping the motor. The mechanisms of this invention are characterized as being rugged, long wearing, adjustable, reasonably inexpensive to manufacture and more accurate than those now commercially employed and may be easily and readily controlled and is compact. By employing the driving mechanism of this invention and coupling it with an X-ray roll film camera, it is possible to obtain either single or multiple exposures at predetermined intervals. The mechanism may be controlled to obtain a wide variety of exposures. The operator may, at will, obtain this wide variety of exposures at predetermined intervals. The number of exposures between intervals may be controlled as may be the magnitude of the intervals. By employing this novel apparatus, it is possible to obtain, for example, a roll film exposure of one half second, an interval of a half a second, film exposure of one half second, interval of one half second, and so on. Besides having the aforesaid advantages, it is also possible to control the time of each exposure and interval between successive exposures. Therefore this apparatus is of such a nature as to provide a great degree of flexibility in the hands of the operator, which is one of the main features of the invention. These as well as other objects and advantages of the invention will be readily apparent from the following description and appended drawings:

Fig. 3 is a cross-sectional view taken on line III—III of Fig. 2.

Fig. 4 is a cross-sectional view taken on line IV—IV of Fig. 3.

Fig. 5 is a cross-sectional view taken on line V—V of Fig. 3.

Fig. 6 is a cross-sectional view taken on line VI—VI of Fig. 3.

Fig. 7 is a wiring diagram employed in the invention.

Figure 1:
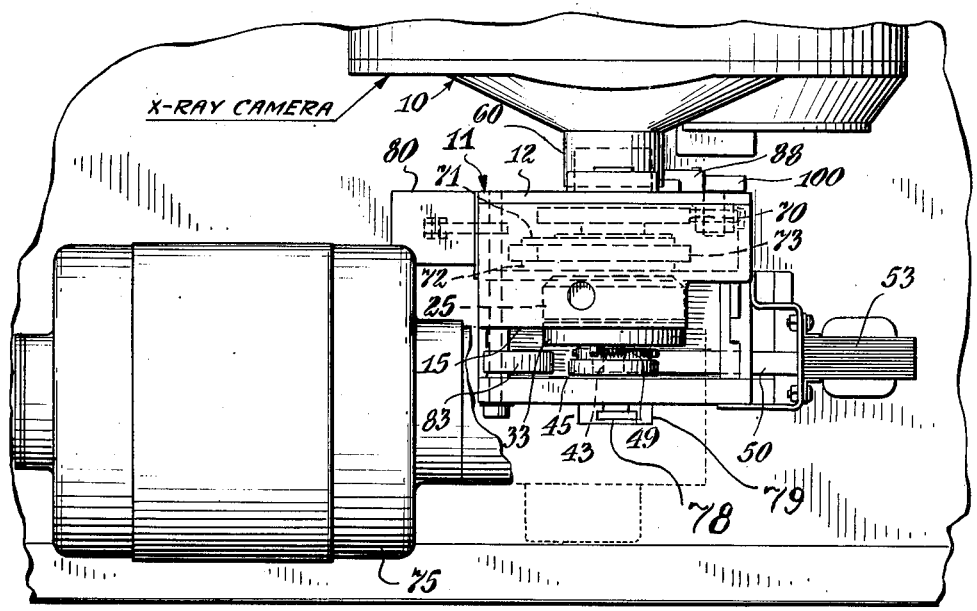
Fig. 1 is a top plan view of the novel driving mechanism coupled with an X-ray camera, shown only partially.
Figure 2:
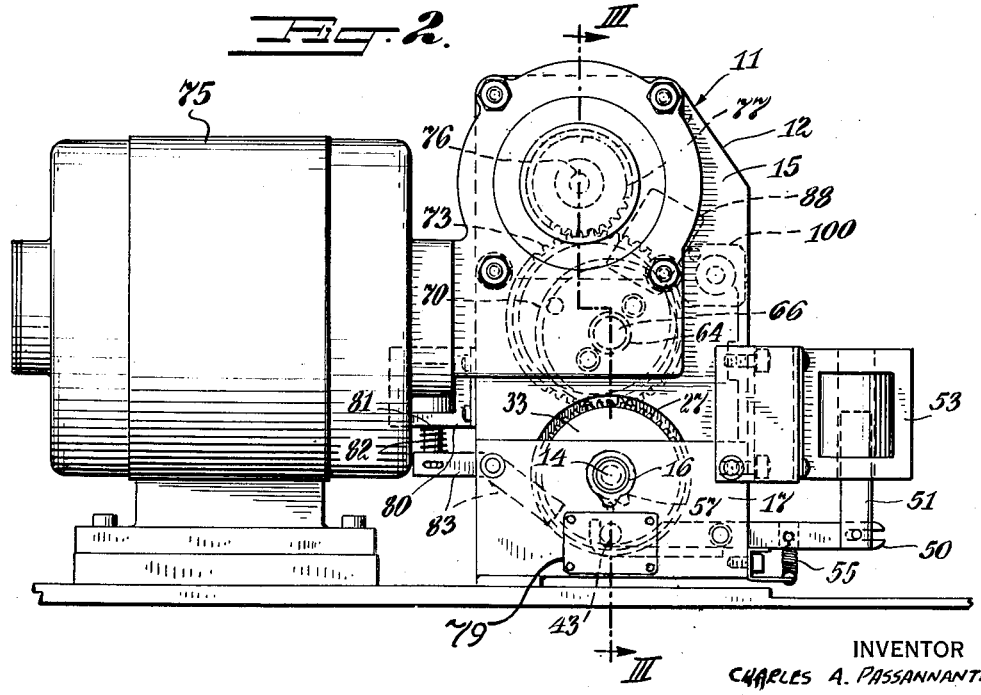
Fig. 2 is a view in side elevation of the driving mechanism shown in Fig. 1.

As shown in the drawings the novel drive mechanism of this invention, which may be produced as a unitary assembly capable of being readily coupled with a roll film X-ray cassette 10 and also with an X-ray tube comprises a housing 11 having a front face plate 12. The face plate 12 has an opening near the lower end thereof accommodating a bearing 13 for a clutch shaft 14. The housing 11 has a rear face plate 15 having an enlarged opening near its lower end through which extends the shaft 14 journaled in bearing 13. The other end of the shaft 14 is journaled in a bearing 16 carried by a supporting plate 17 secured to a pair of spaced ears extending rearwardly from the rear plate 15. Rigidly pinned to the clutch output shaft 14 by locking pin 19 is a drive gear 21 disposed adjacent the rear face of the front plate 12. Also mounted on the shaft 14 is a clutch and gear arrangement. Adjacent the gear 21 is a bearing 23 mounted on the shaft 14. The bearing 23 is carried by a rotatable outer cage 25 of the single-revolution clutch shown in the drawings. Keyed to the element 25 and rotatable therewith is a gear 27 at the front end thereof. The rear of the element 25 is recessed to accommodate a cam 29 keyed to the shaft 14. The cam 29 has three flat sections 28 disposed 120° apart. Located between each of said flat sections 28 and the interior of the element 25 at the recess part thereof is a cylindrical roller 31. Centrally mounted on shaft 14 is a disc or collar 33 having three pairs of fingers 35 disposed 120° apart and extending into the space between the elements 29 and 25, with a roller 31 disposed between each pair of fingers to control the position of the rollers 31 for rendering the gear 21 operative and inoperative. Concentric with the recess carrying the element 29 is another recess carrying a lubricating packing 41. Extending outwardly from the rear face of the collar 33 is a clutch release pin 43. Also mounted on the shaft 14 and extending rearwardly from the collar 33 is another collar 45 rigidly secured thereto and having a flange. Located in the space between the flanged collar 45 and the collar 33 are a pair of tension springs 49, each of which has one end secured to the rear face of collar 33 and its other end secured to collar 45. These springs continuously act upon the element 33 and tend to rotate the collar 33 to revolve the fingers 35 to maintain the rollers 31 in operative position. By applying pressure to the pin 43 the collar 33 may be rotated against the action of the springs 49 to release the locking action of the rollers whereby the collar 25 and gear 27 may be rotated in either direction. Mounted on the rear of the housing 12 near the lower end thereof is a pivoted lever 50 one end of which is located adjacent the pin 43 and the other end of which is slotted to accommodate the cross pin carried by the core 51 of the solenoid 53 secured to the housing 12. A tension spring 55 has one end secured to the rear part of the lever 50 and has its other end secured to a bracket carried by the housing 12 and tends to force the front end of the lever against the pin 43 to cause disengagement of the clutch by locating and maintaining the rollers 31 in inoperative position, as shown in Fig. 4.

Mounted on the shaft 14 exteriorly of the front face is a cam 57 which is keyed thereto. Also mounted on the front plate 12 and exteriorly thereof is a switch 58, for a contact actuator which is controlled by the action of the cam 57 for timing the period of energization and deenergization of solenoid 53 which in turn controls the lever 50 for the clutch mechanism.

Mounted at about the mid-portion of the front plate 12 is a bearing 60 having a cup 62 integral therewith and extending outwardly therefrom. Mounted in the rear face plate 15 at about the mid-portion thereof is a bearing 64 extending into said housing. A driving pin 66 is journaled in said bearings 64 and 60. The driving pin 66 extends outwardly beyond bearing 60 and terminates in a head. A compression spring 68 is located in the cup 62 and bears against the bottom of the cup and the head of pin 66 and tends to maintain the driving pin 66 in its outermost position. The pin 66 has a slot therein through which passes an anchor pin 69 rigidly secured to the collar of a gear 70. A block 71 is eccentrically mounted on the bearing 64 and is maintained stationary by a plurality of anchor screws extending through back plate 15. One end of the block 71 is recessed to carry a ring or washer plate 72. The center portion of the block 71 is also recessed to provide an annular groove between the flange thereof and the ring washer 72 in which is located a gear 73 which is free to rotate therein.

A motor 75 is mounted at the upper end of the housing and the shaft 76 thereof extends into and through said housing and plate 12, and has a gear 77 keyed thereto and meshing with the gear 73, which in turn meshes with the gear 27. Outside the upper end of plate 12 an exposure control cam 78 is keyed to the other end of shaft 14. Mounted on plate 17 is a switch 79 which is controlled by cam 78.

On lower part of plate 12 is mounted a solenoid 80 having a core 81 having a spring 82 therearound normally tending to move the core 81 downwardly. Lower end of core 81 is pivotally connected to a lever 83 pivoted at one end to plate 12 and has a forward end for engaging pin 43.

A switch 88 is also carried by plate 12. The camera 10 has a shaft 89 extending therefrom and controlled by the internal mechanism thereof which feeds film. During each film feed, this shaft makes a single complete revolution to so rotate cam 100 keyed thereto which actuates switch 88.

The various switches and solenoids are electrically connected as shown diagrammatically in Fig. 7. A pair of line conductors 90 may be connected to a standard 110 volt A. C. source of supply and one of the conductors has a master line switch 91 therein. Motor 75 is a variable speed motor and is connected across the conductors 90 through a variable resistance 92 which may be mounted on a panel board. The resistance 92 may be varied for varying and controlling the speed of the motor which is the primary drive for controlling the time of exposure and also the time intervals between exposures. Also across the lines 90 is a normally open indicator switch 88 which is mounted on the face plate 12 and is in series with an indicator such as a lamp, counter or the like 89 mounted on the panel. The indicator serves to apprise the operator when each exposure is taken. Also across the lines 90 is the winding solenoid 53 in series with the normally open switch 58, and a manually operable switch 95. Also across the lines 90 is an X-ray tube 96 in series with the normally open switch 79 and a time delay relay 93. A solenoid winding 80 is shunted across said tube 96 and relay 93 which is so set that the X-ray tube circuit is made a predetermined time after the solenoid circuit is made upon closing of switch 79 by action of cam 78.

The operation of the novel apparatus is briefly as follows:

The system is preconditioned by first closing the main switch 91 and the resistance 92 is set, thus presetting the speed of the motor 75 which determines the time factors of the entire system. When switch 91 is thrown to complete the circuit, the motor turns to drive at predetermined constant speed its shaft 76 which drives gear 77 in turn driving the gear 73 which in turn drives gear 27 which drives the part 25 of the clutch. The clutch which is now in inoperative condition because of the action of the lever 50 against pin 43 to maintain the rollers in operative position against the action of the springs 49. This condition is maintained with the shaft 14 and the shaft 66 being stationary until the operator performs the next necessary act for taking of picture. Assuming that the operator desires to obtain a single picture whose exposure time is one-third of a second, for example, the resistance 92 having already been preset for such an exposure time, the operator then merely presses the switch 95 momentarily to close that switch. Upon closure of switch 95 the solenoid winding 53 is energized, whereupon the core 51 is actuated upwardly and acting against the action of spring 55 swings the lever 50 clear of the release pin 43. When that occurs the springs 49 rock fingers 35 to locate the rollers 31 in engaging or operative position to latch the constantly rotating element 25 with the element 29, whereby the shaft 14 is set in motion. Rotation of shaft 14 drives exposure control cam 78 and solenoid interlock cam 57 and also drives gear 21 which in turn drives gear 70, which drives the driving pin 66 which drives the film feed roll of the camera to feed or advance a length or stretch of the film to be exposed.

Upon closure of the switch 95, the cam 57 acts upon the switch 58 to maintain it in closed condition for a predetermined period. The length of the effective portion of the cam 57 is such that it acts upon the normally open switch 58 for only a short period of time, so that the switch 58 will automatically return to open position. When this occurs, even if switch 95 is closed, the solenoid 53 is de-energized whereupon core 51 moves to relocate the lever 50 in its operative position by the action of spring 55 before the cam 57 has made one complete revolution.

During the initial period that the switch 58 was maintained in closed condition the idler 25 has rotated sufficiently to advance the pin 43 beyond the path of lever 50. Idler 25 and pin 43 advance until pin 43 strikes against one end of control lever 83 which acts like lever 50 to cause unlocking of the clutch elements 25 and 29 which results in stopping of shaft 14 and consequently terminates film advancement which took place during rotation of control shaft 14 over a fraction of a revolution. Immediately upon striking of pin 43 against stop lever 83 to stop shaft 14, the cam 78 closes normally open switch 79 to make the X-ray tube and time delay circuits. The shaft 14 is now stationary and current flows through the pre-set time delay and X-ray circuits whereupon X-rays pass through the body to be X-rayed. The time delay 93 controls the time that energy is supplied to the X-ray tube 96 and after that period, the solenoid 80 is energized to actuate the lever 83 whereupon the pin 43 is disengaged, clutch elements 25 and 29 are interlocked and clutch elements and shaft 14 rotate to complete a single revolution which is controlled by the action of lever 50 on pin 43.

The internal mechanism of the camera 10 was pre-set so that film advancement occurs during only alternate driving of pin 66, and the cam 100 also so rotates and makes a complete revolution during each alternate drive of pin 66 to actuate switch 88 to energize the counter 89. If it is desired to obtain a series of pictures or exposures, all that the operator need do, is to maintain the switch 95 in closed position for sufficient time for obtaining the desired number of pictures about which he is apprised by the indicator 89. In this manner I employ a primary drive 76 which may be driven continuously at different constant speeds by pre-setting of resistance 92 and while continuously driven, X-ray pictures of desired exposure times and desired intervals between exposures may be taken.

I claim:

1. Apparatus for controlling film feed of a roll film camera having a film drive input shaft, comprising a single revolution clutch, a control shaft, an element of said clutch secured to said control shaft and rotatable therewith and thereby, an idler element of said clutch carried by said control shaft, means for interlocking said elements when disposed in one position relative thereto and for unlocking said elements when disposed in another position relative thereto, an output shaft, said output shaft adapted to be coupled with said input shaft and being operatively connected to said control shaft, said output shaft being driven by and rotatable only by rotation of said control shaft, a motor having a motor shaft driven thereby, said motor shaft being operatively connected to said idler element and both being constantly driven when said motor is energized, means for controlling said first mentioned means.

2. Apparatus for controlling film feed of a roll film camera having a film drive input shaft, comprising a single revolution clutch, a control shaft, an element of said clutch secured to said control shaft and rotatable therewith and thereby, an idler element of said clutch carried by said control shaft, means for interlocking said elements when disposed in one position relative thereto and for unlocking said elements when disposed in another position relative thereto, an output shaft, said output shaft adapted to be coupled with said input shaft and being operatively connected to said control shaft and being driven by and rotatable only by rotation of said control shaft, a motor having a motor shaft driven thereby, said motor shaft being operatively connected to said idler element and both being constantly driven when said motor is energized, tension means normally tending to move said first mentioned means in position for interlocking, means for acting against the force of said tension means for maintaining said elements in unlocked condition for the control element being stationary while idler rotates, means for moving said last mentioned means to inoperative position, and another means for acting against the force of said tension means to unlock said elements while rotating in interlocked condition to terminate rotation of said control shaft.

3. A system for feeding film in a roll film camera and taking X-ray pictures comprising a roll film camera including a film drive in combination with an electric motor having a motor shaft, a single revolution clutch, a control shaft, said clutch carried by said control shaft, said clutch including an idler element operatively connected to said motor shaft and a drive element secured to said control shaft for driving said control shaft when said elements are locked together, means for interlocking and unlocking said elements, means for controlling said last mentioned means and controllable by rotation of said control shaft, and means for controlling an X-ray circuit, said means also controlled by the rotation of said control shaft, an output shaft for driving said film drive, said output shaft being operatively connected to said control shaft and driven thereby.

4. A system for automatically taking an X-ray picture, comprising a roll film camera having a film drive, a variable speed electric motor in series with a variable resistance, said motor having a motor shaft, a single revolution clutch, a control shaft, an output shaft operatively connected to said film drive and operatively connected to said control shaft, said clutch carried by said control shaft, said clutch including an idler operatively connected to said motor shaft and constantly driven thereby during energization of said motor and also another element for driving said control shaft only when said elements are interlocked, means for interlocking said elements, means for rendering inoperative said interlocking means, and means for controlling the period said elements are interlocked to control the degree of rotation of the control shaft in turn controlling the feeding of film, an X-ray tube and means for energizing said X-ray tube and controlling the period of energization thereof.

5. Apparatus for controlling film feed of a roll film camera having a film input shaft, comprising a housing, a control shaft carried by said housing, a single revolution clutch mounted on said control shaft, an element of said clutch secured to said control shaft and rotatable therewith and thereby, an idler element of said clutch carried by said control shaft, movable means for interlocking said elements when disposed in one position relative thereto and for unlocking said elements when disposed in another position relative thereto, an output shaft carried by said housing, said output shaft adapted to be coupled with said input shaft and being operatively connected to said control shaft, said output shaft being driven by and rotatable only by said control shaft, a motor having a motor shaft driven thereby, a plurality of gears operatively connecting said idler element and said motor shaft, both said motor shaft and idler element being constantly driven when said motor is energized, and means for controlling said first mentioned means.

CHARLES A. PASSANNANTE.

REFERENCES CITED

The following references are of record in the file of this patent:

UNITED STATES PATENTS

| Number | Name | Date |
|---|---|---|
| 2,166,440 | Jones | July 18, 1939 |
| 2,517,781 | Gacki et al. | Aug. 8, 1950 |
| 2,526,094 | Stava | Oct. 17, 1950 |